United States Patent
Kessler et al.

(10) Patent No.: US 7,290,175 B1
(45) Date of Patent: Oct. 30, 2007

(54) FORCING A MEMORY DUMP FOR COMPUTER SYSTEM DIAGNOSIS

(75) Inventors: Diane L Kessler, West Chester, PA (US); Robert J. Ohren, Chester Springs, PA (US)

(73) Assignee: Unisys Corporation, Blue Bell, PA (US)

( * ) Notice: Subject to any disclaimer, the term of this patent is extended or adjusted under 35 U.S.C. 154(b) by 530 days.

(21) Appl. No.: 10/647,826

(22) Filed: Aug. 25, 2003

Related U.S. Application Data

(60) Provisional application No. 60/405,951, filed on Aug. 26, 2002.

(51) Int. Cl.
*G06F 11/00* (2006.01)
(52) U.S. Cl. .......................................... 714/37; 714/34
(58) Field of Classification Search .................. 714/23, 714/21, 24, 34, 37, 242
See application file for complete search history.

(56) References Cited

U.S. PATENT DOCUMENTS

| | | | |
|---|---|---|---|
| 6,226,761 B1 * | 5/2001 | Berstis | 714/37 |
| 6,543,010 B1 * | 4/2003 | Gaudet et al. | 714/45 |
| 6,697,973 B1 * | 2/2004 | Baumeister et al. | 714/55 |
| 6,738,932 B1 * | 5/2004 | Price | 714/38 |
| 7,010,724 B1 * | 3/2006 | Hicok | 714/39 |

OTHER PUBLICATIONS

BIOS—http://en.wikipedia.org/wiki/BIOS.*
Storage device—http://en.wikipedia.org/wiki/Storage_device.*

* cited by examiner

*Primary Examiner*—Yolanda L Wilson
(74) *Attorney, Agent, or Firm*—Richard J. Gregson

(57) ABSTRACT

Diagnostic memory images are obtained from a computer system when a system freezes or fails to take a memory dump when otherwise needed. A computer system provides an improved mechanism for obtaining a memory dump of the contents of the memory associated with the particular computing system when a system freeze or crash occurs. The computing system may also correspond to a software partition running within a computing system. A software partition corresponds to a subset of the hardware under control of an instance of an operation system executing on a full computer system.

29 Claims, 7 Drawing Sheets

FORCING A MEMORY DUMP FOR COMPUTER SYSTEM DIAGNOSIS

RELATED APPLICATIONS

This patent is based on and claims priority from the Provisional Application Ser. No. 60/405,951, filed Aug. 26, 2002.

BACKGROUND

This patent relates generally to computer operating system and BIOS level features for providing enhanced debugging capability to users and builders of large-scale computer systems, particularly multiprocessor computer systems. It can be applied to such Systems having Service Processors and to those which do not have Service Processors.

Computer systems that stop running, hang, or freeze, need to be studied to find out what went wrong, in order to fix the problem with some degree of confidence. Traditionally this meant dumping the core memory and looking at the data in it to discover what went wrong. While there are many other things one can do, this traditional operation is still valuable. Unfortunately, rebooting the System destroys the memory image from the failure. Traditional methods relied on debugging the problem in real-time, looking at the memory live. This approach is impractical from a customer point of view where the system needs to be halted for an undetermined amount of time.

Unfortunately, many modern systems don't have a way to dump the core memory from such systems without a process or hardware to prevent the memory image from being corrupted first. For example, when a running an X86 or other INTEL-architecture operating system, and it "freezes" (that is, it no longer responds to input or raising of an NMI (Non-maskable Interrupt) or fails to take a memory dump), it is very difficult to diagnose the problem without the ability to capture the contents of memory for analysis, but there is no current facility to obtain the needed uncorrupted memory dump. Thus, X86 and other INTEL-architecture operation system computers can benefit from such a facility and would be a valuable contribution to the use of the technology.

The inventors herein employ the reboot process itself to assist in capturing the memory image, which is unlike the prior designs which used non-reboot processes for looking at the memory images. Further, we are able to send the memory image to long term storage for analysis at a later time and/or other location.

Appropriate background documentation for understanding the X86 environment include:

1. MICROSOFT WINDOWS operating system 2003 DDK (build 3790)—contains the compilers used for the BCD program.
2. The Undocumented PC $2^{nd}$ edition (for INT information) ISBN 0-201-47950-8—for the documentation of the BIOS INT 10h, INT 13h, and INT 15h interfaces.
3. IA-32 INTEL microprocessor Architecture Software Developer's Manual Volumes 1-3 (Order numbers 245470, 245471, and 245472).
4. Advanced Configuration and Power Interface Specification Revision 2.0 Jul. 27, 2000 Chapter 15 for the System Address Map Interface.

It should be noted that the concepts taught herein can be applied to IA64, EFI, and possibly other processor computer environments with appropriate modification.

SUMMARY OF THE INVENTION

This invention provides a system and method for obtaining diagnostically useful memory image from a computer system when the system freezes or fails to take a memory dump. The computer system may be a partition (subset of the hardware under control of an OS) or a full system.

A computer system is considered frozen or hung when it no longer responds to input from the keyboard or mouse, or raising of an NMI (Non-maskable Interrupt), or fails to take a memory dump.

The following provides a summary of the components that are used by the preferred embodiment to provide the Boot Crash Dump feature.

OS (Operating System) component or driver—This component is used on Systems that do not collect information about the OS key components until the OS is about to take a crash dump. The purpose of this component is to gather key information about the System on which it is running and store it in memory in a way that it can be found later (either by storing it at a fixed location or storing it in non-overlayable memory with tags around the structure (other methods may be used for making the structure identifiable)). The information gathered is later used by the OS's dump analysis tool.

Storage device (removable, fixed, or networked) for storing the memory image—This is preferably a disk drive that is accessible from BIOS boot as one of the first 8 disks which the BIOS normally has ready access to. It must be large enough to hold the dumped contents of System memory. Although, any type of storage that is accessible by the BIOS or a BIOS driver can be used. The storage can be comprised of a single storage unit or multiple storage units. This storage unit is identified in the System by a "dump" pattern that is written by the Smear program.

A Smear application—This is an application that can be used to write a recognizable "dump" pattern to a storage device. It is used to prepare the storage device (removable or fixed) for use by the Boot Crash Dump feature in our preferred embodiments.

BIOS or Service Processor support for Boot Crash Dump—In order for Boot Crash Dump to capture a true dump of a System, the first 4 Meg bytes of the System memory must be preserved immediately following the incident that required the System to be dumped. This is explained in further detail later in this document. The BIOS and platform must also support booting the partition without reinitializing the memory contents. When taking a Boot Crash Dump the BIOS should not do any destructive memory testing.

The Boot Crash Dump (BCD) application—This is a BIOS application that is usually available on a bootable media, such as floppy or CDROM. Its purpose is to capture the contents of the System memory, compress it and store it to the storage device mentioned above. It searches for a storage device, such as one of the first 8 disks visible to BIOS, with the "dump" pattern and takes a dump of the System memory to that storage device. It is strongly preferred that it will ONLY take a dump to a storage device that contains the "dump" pattern in order to avoid overwriting user data. Other methods for setting aside a save area for the dump may also be used if desired. Note: We prefer to begin with a "smear program" to safely prepare storage device (removable or fixed usually a disk drive, for example). The method of using a previously prepared storage device ensures that user data is not overwritten by the Boot Crash Dump program. This behavior is optional.

A Consolidator application—This is what we call an application that is used to consolidate the dump that was captured and saved to the storage device by the BIOS application mentioned above. The storage device on which the dump was taken must be moved to a running OS system where this application is run. This application decompresses the dump, locates the region containing the first 4 Meg bytes of memory saved by BIOS or Service Processor and formats the result into a dump file. This application is necessarily OS centric. Each OS has its own dump analysis tool and the format of the dump file is specific to the tool. Likewise, each OS may have particular information that it uses for essential features and in applying this invention to such OSs, the user should take care to preserve the information for use by their Consolidator program. For Systems running Windows, the application would create a DMP file that can then be analyzed by MICROSOFT® WinDbg. The reader of ordinary skill in this art is expected to be thoroughly familiar with the OS system being catered to in implementing this invention as well as the System in which it will be used.

A first part of the method and system generally provides a way to dump the contents of system memory essentially as it exists at the point of a freeze of the System, after the System has been rebooted. This is accomplished by either using a modified BIOS or a Service Processor, and a bootable program to capture the memory image to some storage device (removable or fixed).

A second part of the method and system describes a means to make the memory dump image readable by operating system's memory dump analysis tools. For some Operating Systems, such as MICROSOFT® WINDOWS, that do not collect information about the OS key components until the OS is about to take a crash dump, an active piece of software, such as a driver, collects physical addresses of necessary OS specific information needed to analyze the dump, and stores it into permanent memory before the system freezes/hangs. This can generally be done when the OS instance that runs the System is first started. The information collected must be stored in a way or a place that is known or identifiable so that the Consolidator program can later find it.

The act of rebooting a System changes the contents of memory. The first several MB of memory and certain other locations are used by the BIOS or other basic operating system for its code and stack. Also, many BIOSs write memory during the discovery/testing of memory. One approach is to access the memory through the use of a Service Processor associated with the System, in order to preserve the memory about to be overwritten through the subsequent system initialization. A method for preserving the first several MB of memory is to have the Service Processor, using an existing hardware associated maintenance interface which provides access into the frozen system, capture the contents of the memory and transfer these contents to a storage device. Another method is to use the Service Processor to set a flag to signal a modified BIOS to copy the first several MB of memory to a reserved area of memory. The BIOS was also modified to ensure that it only executes and stores data in the preserved memory region (Specifically, and most importantly, it does not do memory testing, which would destroy the contents of the main memory which we are trying to preserve.) The Service Processor also gathers all relevant hardware state information to be used later during analysis.

Once the BIOS or other basic operating system has finished its function, control is then transferred to the memory-dumping program (Boot Crash Dump (BCD)) that either resides on bootable media (on a floppy/CDROM/etc.) or is a BIOS extension.

The memory-dumping program (BCD) captures all usable system memory above the lower portion already preserved by the Service Processor or BIOS, and transfers it to a storage device. This is done in such a way that the association between the contents of the memory and its physical address is maintained. The memory ranges (E820 information) are also stored to the storage device.

To make the raw system memory analyzable by a dump analysis tool, the memory needs to be consolidated and formatted into the layout expected by the dump analysis tool. Each OS has its own dump analysis tool and format the tool expects for the dump file. For open source systems, it is easier to derive the dump file layout. However, for a proprietary OS this is a difficult (if not impossible) task. A Consolidator program is used to decompress the dump, locate the region containing the first 4 Meg bytes of memory saved by BIOS or Service Processor and format the result into a dump file. This application is OS centric.

One piece of critical information needed for analyzing a frozen system is the contents of the internal registers of the processor at the time the system stopped responding (registers such as: eax, ebx, ecx, edx, esi, edi, eip, esp, ebp, cs, ss, ds, es, fs, gs, efl, cr0, cr2, cr3, cr4, gdtr, gdtl, idtr, idtl, tr, and ldtr to name a few). Unfortunately, the information on how to access these registers from a Service Processor (using JTAG or other interfaces) is proprietary to the processor chip manufacturer and not generally available without access to confidential information. One method to capture the register information is to use System Management Mode (SMM). This requires support of SMM from the BIOS and the use of a Service Processor to raise the System Management Interrupt (SMI). The particulars of this will be unique to each individual computer system. The ES7000 multiprocessor computer system from Unisys uses the TAP linker (an IEEE standard interface) to communicate data between the System and the Service Processor using JTAG software conventions.

Even without the processor register information, the dump still contains valuable information about what was happening when the system froze. We are able to locate the stacks the processors are running on, but we will not be able to pinpoint the exact location in the stack the processor was executing or the code being executed.

Note that the following conditions are not addressed by our BCD program:

Broken hardware which cause the integrity of the memory to be corrupted; systems not bootable; and no accessible storage device to preserve the memory contents.

Also, it is relevant to note that when we discuss a Maintenance Interface, we are talking about one that provides the interface for the Service Processor to access the hardware state (read/write) and identification information. In the preferred embodiment it may utilize the Command Management Interface (CMI), which is based on IEEE 1149.1, also called JTAG. Also when we talk about the Service Processor, in the Unisys ES7000 computer systems this is a separate entity (PC, embedded system) that can connect to and can drive the maintenance interface. Other systems can use similar maintenance systems as may be desired.

DETAILED DESCRIPTION OF THE PREFERRED EMBODIMENT

The preferred embodiment employs a program that we call "Boot Crash Dump" (BCD) for obtaining a diagnostic memory image from a non-responding X86 computer system (a system that is hung/frozen or fails to take an Operating System (OS) initiated memory dump) by collecting the memory image after the system is rebooted.

Figure 6:
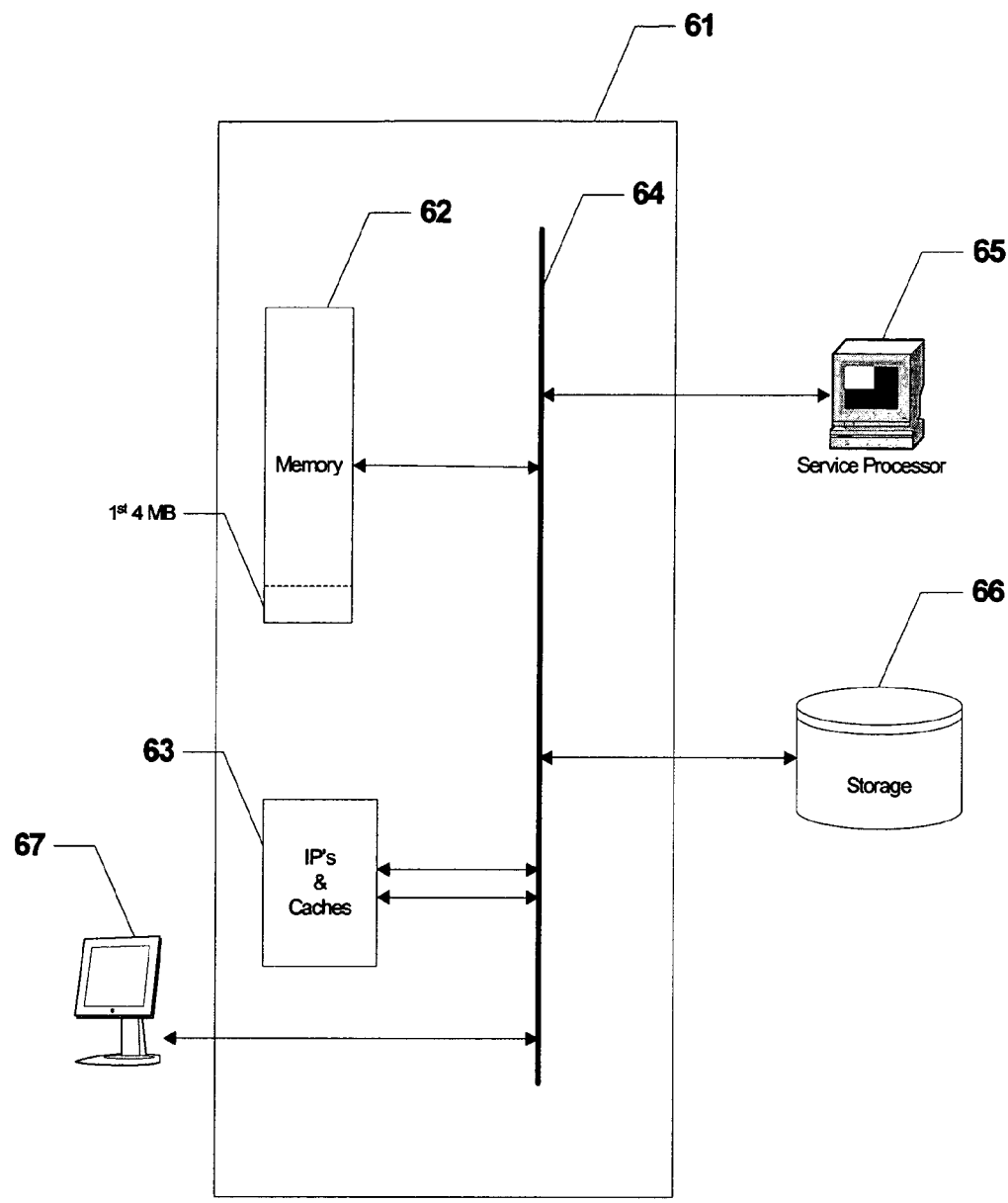
FIG. 6 is a block diagram of a typical computer system for which this invention may be employed.

Typical computer systems for which this invention may be used are similar in basic design to that system 60 shown in FIG. 6. The Service Processor 65 has access to the bus 64 (and/or through other means (such as a TAP linker interface using JTAG, not shown)) to the other components of the computer 61. This system has a single main memory 62 and a number of instruction processors and their caches 63 which also access the bus 64 for moving data around the computer 61. Some multiprocessor computer systems will have the main memory divided amongst the processor units as cells, but this invention can work with such designs as well. A console or affiliated system 67 will be available through which a bootable volume may be provided.

Figure 7:
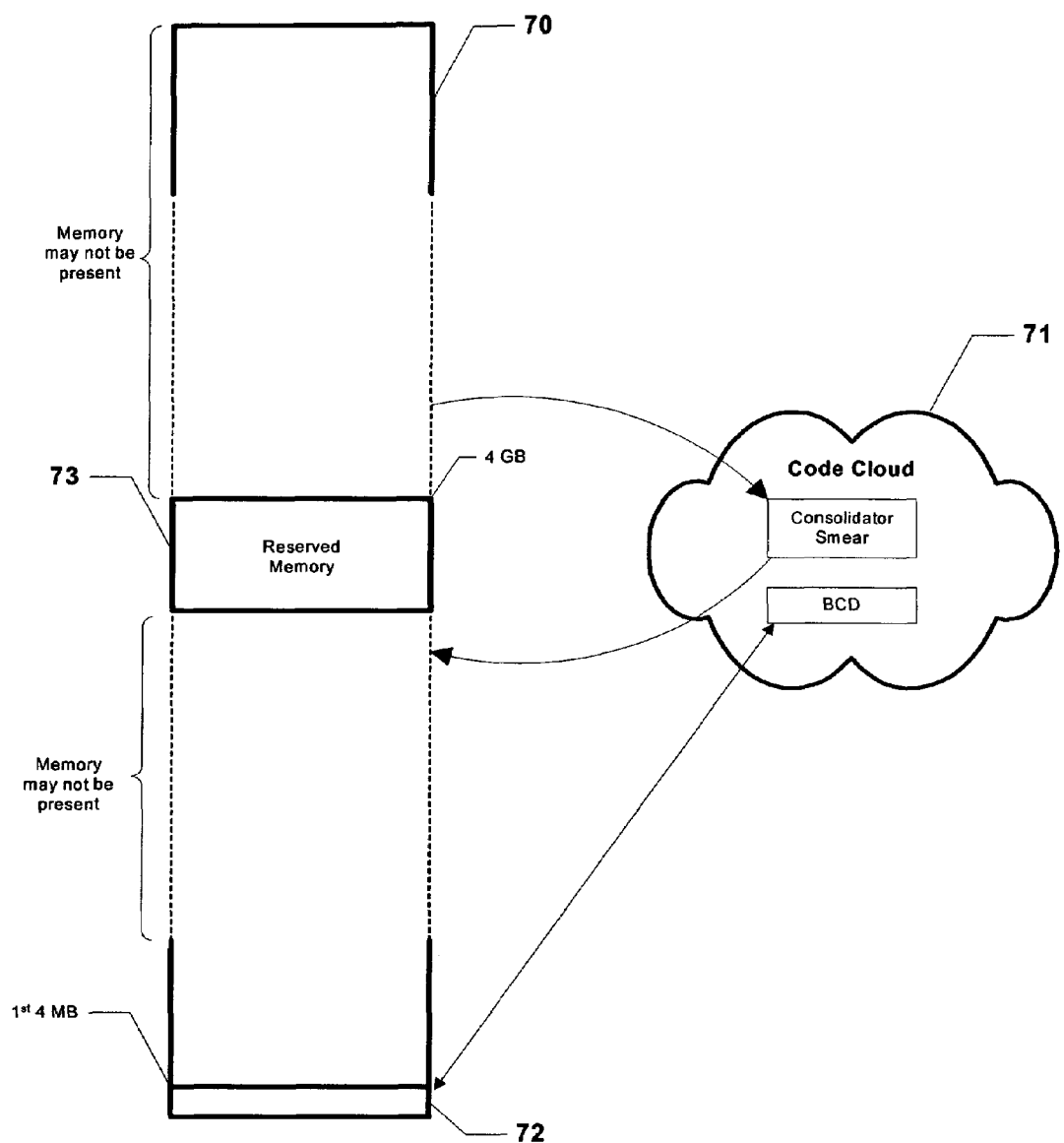
FIG. 7 is a limited memory map diagram of a main memory for a computer system such as the computer system of FIG. 6, employing the invention.

The memory 62 is redrawn in FIG. 7 as a logical memory space 70, pointing out the first four megabytes of storage 72, also known as Lo Mem, which is copied into the reserved region of memory below 4 GB also known as Hi Mem space 73 as indicated elsewhere in this description for the preferred embodiment. The three main software components illustrated in the code cloud 71 are swapped into and out of the main memory space 70 as needed to run.

The act of rebooting the system generally changes the contents of memory. The BIOS uses the system memory below 4 MB for the BIOS (Basic Input Output System) code, stack, local data and so forth. Many BIOS's test memory during POST (Power On Self Test) including address line tests, read/write tests of conventional and extended memory, etc. These tests can change the memory image that needs to be dumped, thus making the contents after the BIOS boots unusable for diagnostic purposes. Some BIOS's use regions of memory above 4 MB as scratch memory for building structures such as the ACPI tables (such as the MAPIC tables). These tables are required by PnP (Plug n Play) architecture. Other OSs may have other structures and procedures saved to various designated memory regions to set up the running of the system under control of the OS. Pointers to or data from these should be identifiable through information in the header to the file that the Consolidator produces in order to allow the debug facility to find them. Such memory areas should clearly be saved if we want to have the optimum diagnostic memory dump. In the Linux OS, these structures and resources are in what is called a MAP file.

In systems having multiple partitions with different types of OSs running in them, clearly adaptations for the OS for each partition will be required.

For the BCD to successfully dump the full contents of memory, the region of memory modified by the BIOS needs to be captured before the BIOS changes it during the new boot sequence. The most straightforward approach is to modify the BIOS to help in the collection and maintaining of the contents of memory. These changes are described in the following section.

If the BIOS does not support our BCD and the ability to modify the BIOS code is not available, there are a couple of rules the BIOS must adhere to, in order for BCD to work properly and assure that the data that needs to be dumped does not get overwritten. This unmodifiable BIOS (or one modified to work with our BCD) must support the ability to turn off any destructive POST memory tests. The BIOS should not write to any memory above 4 MB that is not marked reserved in the E820h. The system must be capable of capturing the first 4 MB of memory to some form of external storage. Systems such as the Unisys ES7000 contain a Service Processor which can capture the first 4 MB of memory, and it is capable of running a TCL (Tool Command Language) script that uses a JTAG interface to capture the first 4 MB of memory of a partition and store it on the Service Processor's hard drive. This captured memory can later be transferred to another system to be combined with the contents of memory captured by the BCD program. (We use 4 MB because that is the area dedicated to the BIOS initial load typically, if using this invention for other systems the 4 MB size may be varied.)

The BCD Program is loaded from a bootable media; in the present system this is either a bootable floppy or CDROM by a loader program on the bootable media. The BCD's main function is to dump the contents of memory above 4 MB to a storage device that has preferably been prepared by a Smear program. The easiest storage devices to capture the contents of memory are ones that are supported by the BIOS, i.e. one of the first eight enumerated hard drives discovered by the BIOS. To use a different storage device, a BIOS device driver may need to be written. There are BIOS drivers that support other types of long term memory devices and these may be easily substituted as the media to capture the contents of memory if desired and where appropriate. The storage device used can be comprised of multiple storage devices. In our preferred embodiment, to ensure that the dump does not overwrite storage with valid data on it, the BCD verifies that the first 3 sectors of a storage device contains a predetermined pattern. Prior to the system ever failing, the Smear program is run on a storage device and overwrites the first few sectors with a pattern know by the BCD program. This storage device is then set aside. There are many other ways to ensure that the storage device used by the BCD program is ok to overwrite. This checking is optional. The BCD program also verifies that the storage device chosen is at least 1.5 times the size of memory to be copied. (1.5 times the size of memory was chosen to allow room for the maximum size of a badly compressed file and allow the ability to skip over bad sectors, other size multipliers can clearly be chosen if desired.)

The BCD Program initially runs in Big Real Mode and then switches back and forth between Big Real Mode and Protected Mode. (These names for modes are documented in publicly available INTEL microprocessor Architecture manuals). When running in Protected Mode, BCD uses PSE-36 Page Mode. PSE-36 Page Mode is supported on INTEL X86 processors of INTEL-type "PENTIUM III" microprocessor and later.

When in Real Mode, the BCD Program using the BIOS interrupt interface to Get System Memory Map E820 (INT 15h), Read/Write and get hard drive information (INT 13h), and initialize the console screen (INT 10h). When in Protected Mode, the BCD Program copies and compresses the system memory to a buffer allocated below 4 MB. The buffer is written out in 127K blocks to the prepared hard drive using INT 13h. After all the memory has been compressed and written to the hard drive, the BCD Program Halts.

The use of data compression by the BCD Program is optional, but in a large majority of the time, using compression significantly decreases the amount of time needed to write the contents of memory to the hard drive. The type of compression used by BCD is a Real Time Compression algorithm although any one of the many compression algorithms available could have been used.

Figure 1:
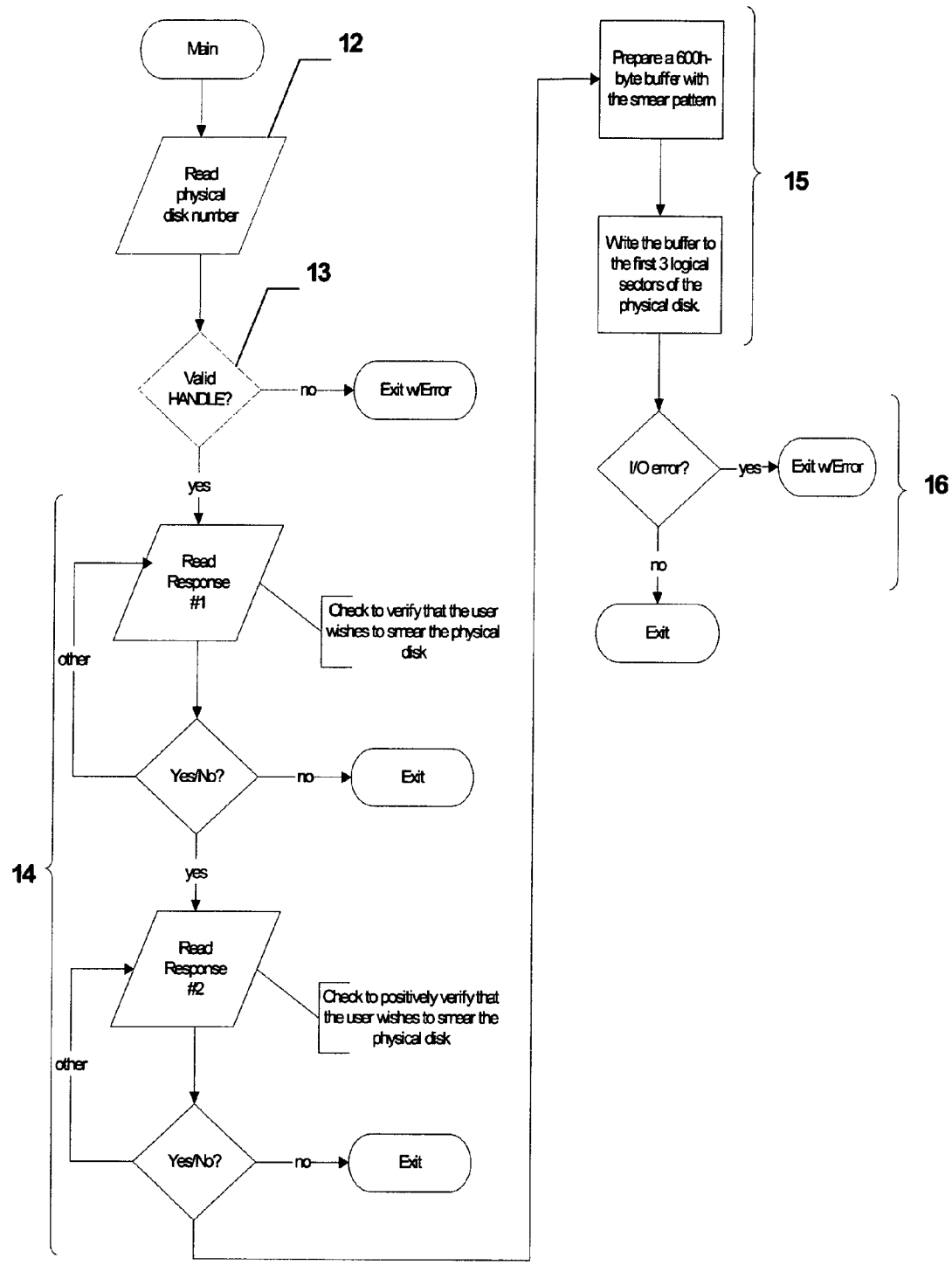
FIG. 1 is a flow diagram of a program for preparing a storage device (removable or fixed such as a disk drive) to accept a crash dump in accord with a preferred embodiment of the invention.

The general flow of the process is as follows:

Prior to failure, a hard drive or other storage device (removable, fixed, or remote) that contains at least 1.5 times the size of the memory of the computer system is prepared by the Smear Program which reserves the storage device by loading it with easily identifiable data. The smeared storage device is preferably of the same type of hard drive (IDE, SCSI, FIBRE, etc.) as the first eight hard drives enumerated by the BIOS, as mentioned above. Although other BIOS supported storage media devices can be used. This is accomplished in the preferred embodiment as per the flow chart 10 of FIG. 1. The following assumes that one of the first eight enumerated hard drives is used to take the dump to.

Later, after the system has frozen or hung:

The prepared storage device is installed into the system as one of the first eight hard drives enumerated by the BIOS (or if a different from the preferred form is used, one of the enumerated known storage device (removable or fixed)).

The bootable floppy or CDROM containing the BCD program is inserted into the system by an operator.

In the preferred embodiment, the operator indicates to the modified BIOS or the Service Processor to capture the first 4 MB of memory (described in more detail below). The Service Processor may initiate the processes itself, if it detects loss of heartbeat from the system. (Many large computer systems have a Service Processor that continually monitors the computer system using a so called "heartbeat" or "I'm still alive" signal, the loss of which indicates a failure of the main computer system.)

When using the a BIOS setup option to capture the first 4 MB of memory, in some systems a second boot may be required to load the BCD program, but it is preferred if the BCD program can be loaded on the same boot.

The BIOS transfers control to the bootable media containing the BCD program, which is loaded into the lo Mem area. DOS may be used to load the BCD program into memory. The preferred method is to use a small loader to pull the BCD program into the lo Mem area and transfer control directly to the BCD program. The BCD program copies and compresses the memory above the first 4 MB and writes it to the prepared storage device. The use of compression is optional.

The bootable floppy/CDROM is removed from the system and the storage device used by the BCD program may or may not be removed Later, on the original system or on another system, the Consolidator Program runs and creates a dump file that contains the contents of memory that has been dumped to the prepared storage device. The exact format of the dump file created by the Consolidator program is dependent on the OS version running on the system at the time of the failure. The resulting dump file is then used in the analysis of the cause of the system failure (why the system froze or hung).

Compilers used to compile the preferred embodiment Boot Crash Dump Program are MICROSOFT® C/C++ Compiler Version 8.00c, and MICROSOFT® MASM compiler 6.15.8803, and MICROSOFT® Linker version 5.60.339 (which are included in the Windows 2003 DDK in the bin16 directory). The compiler used to compile the preferred embodiment Smear Program, and the preferred embodiment Consolidator Program is MICROSOFT® VISUAL STUDIO 2002 C/C++ Compiler Version 13.00.9466.

BIOS Modification

The BIOS modified and used in the preferred embodiment was the PHOENIX Desktop BIOS Version 4 release 6, although other vendor's BIOS should be able to be modified to achieve the same functionality.

The BIOS initially is loaded and runs in a reserved 256K region of memory, which in the PHOENIX BIOS is at C0000H to F0000H. This region is a shadow copy of memory at FFFC0000H to FFFF0000H (System ROM). Part of the 256K region of memory contains the BIOS Setup utility.

There are two preferred methods for triggering the BIOS to copy first 4 MB of memory to the reserved region of memory. One method is to add a new setup option which when set causes the BIOS to copy the first 4 MB of memory. The setup option is then reset after the memory has been copied. (BIOS setup is usually invoked by hitting the F2 key during the booting of the system.) The draw back for using the setup option is that it causes the system to be rebooted again. The second method is to have a Service Processor set a specified bit in the CMOS (or configuration data bit) to specify coping the first 4 MB of memory. While the BIOS is running in the reserved 256K region of memory, it checks to see if the bit is set and if so copies the first 4 MB of memory. Once the BIOS has copied the first 4 MB of memory to a reserved region of memory, the CMOS (or configuration data bit) bit is reset.

The region of memory the BIOS reserves to hold the contents of the first 4 MB of memory must be locatable by what we call a Consolidator Program (Consolidator Program is described in a later section). One method is to select a fixed address. For the Unisys ES7000 computer system, a reserved region of memory at FFF40000h was used. Memory locations for our example will be those we used to run this invention in a Unisys ES7000, but clearly, other suitable memory locations could be used in other computer systems. Another method is to add a new memory type to the BIOS Get System Memory Map function (interrupt 15h function E820h). Currently only address range type values of 1 to 4 are defined. The BIOS interrupt call 15h type E820 returns a table that describes the memory on the system. This table is used to know what memory needs to be dumped. Type 1 memory is available for OS use. Type 2 is reserved and should not be touched. One familiar with INTEL processors and BIOS systems for computers which use them will know what these calls are with a great deal of particularity that therefore need not be described here.

Smear Program

In the preferred embodiment, the Smear program will smear the first 3 sectors of a hard drive with a pattern compatible with the Boot Crash Dump program. Without a valid smeared disk attached to the system, the Boot Crash Dump program will not proceed in taking the dump.

The easiest hard drive to use is one for the Boot Crash Dump program is one of the first eight hard drives enumerated by the BIOS. The size of the hard drive should be at least 1.5 times the amount of memory on the system that may be dumped by the BCD Program. Other storage devices can be used as log as it is supported by the BIOS or a BIOS driver.

In the preferred embodiment, the Smear Program (FIG. 1, flowchart 10) begins by prompting the user for a physical disk number to smear. Once that has been entered and read (step 12), an attempt is made 13 to open this drive for GENERIC_WRITE access. If successful, the user is prompted, preferably at least twice 14, to definitively verify they wish to smear the drive. The first 3 sectors are then smeared 15 with the ASCII pattern "DISKDUMP".

NOTE: Overwriting the first 3 sectors will destroy the Master Boot Record and any file system that may have been on the drive, therefore only users with an appropriate privilege level should have access to this program and it is strongly recommended that the double check of step 14 be carried out.

We include a check for I/O errors 16 for completeness.

Once the Smear Program has completed its task, the Crash Dump program can be activated without concern about overwriting user data. If however, this invention is being used in a system where that is not a concern, it would be advantageous to skip all steps relating to the Smear Program since there would be no concern for user data.

Boot Crash Dump Program

This program performs the dumping of physical memory to a previously prepared hard drive.

Classes/Structures

The following sections provide a detailed overview into the classes and data structures that are used in the Boot Crash Dump program.

Segment Descriptor

Figure 5:
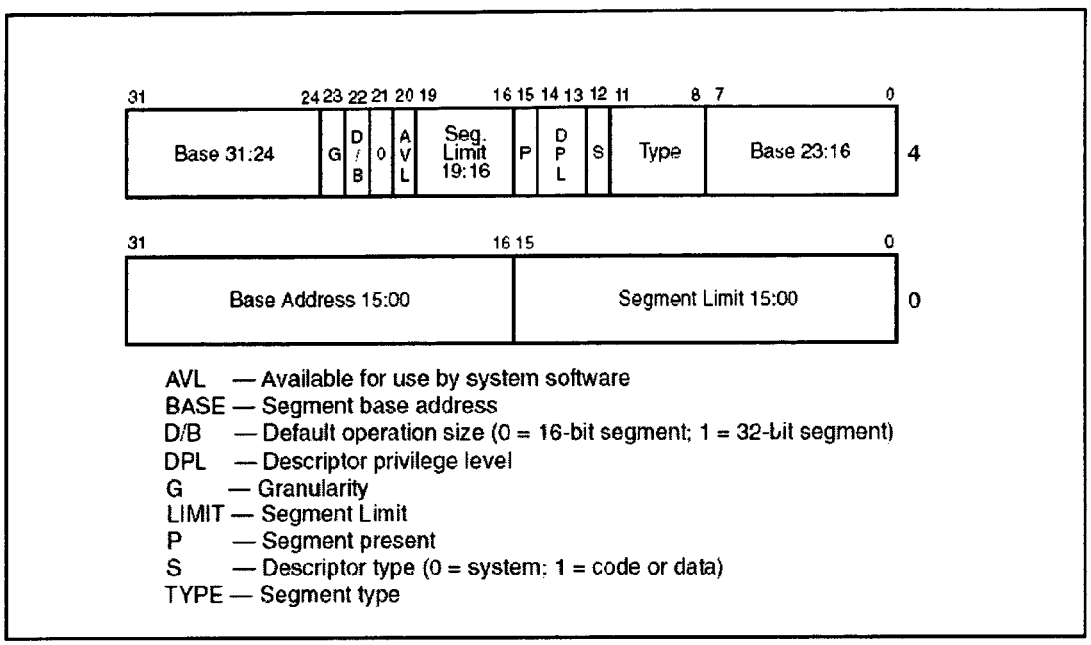
FIG. 5 is a block diagram of the descriptor format used in the preferred embodiment.

A segment descriptor is a data structure that provides the processor with the size and location of a segment, as well as access control and status information. FIG. 5 illustrates a general descriptor format for all types of segment descriptors in two 32-bit words as used in the preferred embodiment. The details of the general descriptor format will be apparent to one of ordinary skill in this art by a quick reference to FIG. 5, but it should be understood that the invention is not limited to the exact organization or size of the segment descriptors, rather that this is the preferred embodiment illustration only.

UINT64

(Used to make it easier to use a 16-bit compiler to address the memory and disk.)

MICROSOFT® C/C++ Optimizing Compiler Version 8.00c contains no intrinsic data type representing an unsigned 64-bit integer. UINT64 class provides an unsigned 64-bit data type and member functions for manipulating 64 bit data types. The following is an overview of the functionality included in this class:

The UINT64 class has two private data members:
low=low-order 32 bits
high=high-order 32 bits Constructors provide methods for initializing and copying UINT64 data objects. The following constructors are implemented:

Default constructor—sets both low and high to 0

Initializing constructor—sets both low and high to an initial value passed in

Initializing constructor—sets low to an initial value passed in, sets high to 0

Copy constructor—used for temporary UINT64 objects.

Overloaded operators (with a UINT64 as an argument) implemented in this class:

!= & &= + += − −= / < <= = == > >=

Overloaded operators (with a 32-bit unsigned integer as an argument) implemented in this class:

!= * + += − −= < << <= = == > >> >=

Methods for accessing the low-order and high-order 32 bits of the UINT64 separately:

LowPart—returns the low-order 32 bits

HighPart—returns the high-order 32 bits

E820 Descriptor

The BIOS used by our preferred embodiment provides support for the Get System Memory Map function (Interrupt 15h, Function E820h), which returns a series of structures (E820_Descriptor) describing system memory usage. The Boot Crash Dump program requires this information to determine which address ranges to actually dump. Other BIOS' may have similar support and could be used if desired and the capacity to return this information is supported.

Format of Bios system memory map address range descriptor:

| Offset | Size  | Description |
|--------|-------|-------------|
| 00h    | QWORD | base address |
| 08h    | QWORD | length in bytes |
| 10h    | DWORD | type of address range (see table below) |

| Value | Mnemonic | Description |
|-------|----------|-------------|
| 1 | AddressRangeMemory | This range is available RAM usable by the operating system. |
| 2 | AddressRangeReserved | This range of addresses is in use or reserved by the system and must not be used by the operating system. |
| 3 | AddressRangeACPI | ACPI Reclaim Memory. This range is available RAM usable by the OS after it reads the ACPI tables. |
| 4 | AddressRangeNVS | ACPI NVS Memory. This range of addresses is in use or reserve by the system and must not be used by the operating system. This range is required to be saved and restored across and NVS sleep. |
| Other | Undefined | Undefined. Reserved for future use. OSPM must treat any range of this type as if the type returned was AddressRangeReserved. |

PMAP Descriptor

"PMAP Descriptors" describe the system memory map address ranges that will actually be dumped. The PMAP_Descriptors contains a cleaned up version of the memory map returned by E820. The format of this 10h-byte structure is as follows:

| Offset | Size | Description |
| --- | --- | --- |
| 00h | QWORD | base address |
| 08h | QWORD | length in bytes |

Sector Pairs

"Sector Pairs" are pairs of sectors that represent ranges on the physical disk where data has been dumped. The format of this 10h-byte structure is as follows:

| Offset | Size | Description |
| --- | --- | --- |
| 00h | QWORD | starting sector number |
| 08h | QWORD | ending sector number |

FD_Header

This 600h-byte (3 sectors) structure is written as a header before the dump. It will contain all the information used to perform the dump, as well as information required by the Consolidation program to recreate an OS-compatible crash dump file. The format is as follows:

| Offset | Size | Description |
| --- | --- | --- |
| 00h | DWORD | header tag #1 |
| 04h | DWORD | header tag #2 |
| 08h | DWORD | major release version |
| 0Ch | DWORD | minor release version |
| 10h | QWORD | sum of memory regions to be dumped |
| 18h | BYTE | number of entries in the system memory map (E820) |
| 19h | E820_Descriptior[20h] | system memory map (E820) |
| 299h | BYTE | number of entries in the PMAP |
| 29Ah | PMAP_Descriptor[20h] | dumped memory map (PMAP) |
| 49Ah | BYTE | number of entries describing sector ranges |
| 49Bh | Sector_Pairs[10h] | array storing ranges of sectors containing the dump |
| 59Bh | BYTE[65h] | random fill characters |

Disk_Address_Packet

Hard drives that support Enhanced BIOS functions require a Disk Address Packet to specify the number of sectors to transfer, the starting logical sector for the transfer, and the memory location for the transfer. The following is the format of a Disk Address Packet for Extended Disk Services:

| Offset | Size | Description |
| --- | --- | --- |
| 00h | BYTE | size of packet (10h for our purposes) |
| 01h | BYTE | reserved (0) |
| 02h | WORD | number of blocks to transfer |
| 04h | DWORD | pointer to the transfer buffer |
| 08h | QWORD | starting absolute block number |

Compressed_Entry

For run-time compression, a buffer containing a series of 9-byte structures is used to describe the original data. Here is the format of that structure:

| Offset | Size | Description |
| --- | --- | --- |
| 00h | BYTE | low 4 bits = first DWORD count |
| | | high 4 bits = second DWORD count |
| 01h | DWORD | first DWORD |
| 05h | DWORD | second DWORD |

Extended_Drive_Information_Table

The BIOS provides supports for the Get Extended Drive Parameters function (Interrupt 13h, Function 48h). This function returns the extended drive parameter table information (Extened_Drive_Information_Table_type) for a specified drive number. Here is the format of that structure:

| Offset | Size | Description |
| --- | --- | --- |
| 00h | WORD | (call) size of buffer |
| | | (ret) size of returned data |
| 02h | WORD | information flags |
| 04h | DWORD | number of physical cylinders on drive |
| 08h | DWORD | number of physical heads on drive |
| 0Ch | DWORD | number of physical sectors on drive |
| 10h | QWORD | total number of sectors on drive |
| 18h | WORD | bytes per sector |

Boot/Initialization Environment

For completeness some basic information about a bootable floppy format used for the preferred embodiment of the invention has been included.

Master Boot Record layout is as follows:

| Offset | Size | Description |
| --- | --- | --- |
| 0 | 1F8h BYTES | loader code |
| 1F8h | WORD | initial offset of execution (defined by the Start label |
| 1FAh | WORD | offset of the data segment with respect to the code segment |
| 1FCh | WORD | size of the program (in sectors) |
| 1FEh | WORD | AA55h = closing tags for a valid MBR |

The Master Boot Record is written to Track 0, Sector 1, Head 0 (the first logical sector on the diskette).

Next, the BCD program is saved to the diskette using the following loop algorithm:

1. Start at Track 1, Sector 1, Head 0.
2. Write the maximum number of sectors per track each time, unless the remainder is less than the maximum. In that case, write the remainder.
3. Each successive time through the loop, increment only the Track number.
4. Attempt each write up to 3 times before a failure is confirmed.

Below is an example figure showing the physical locations of the Master Boot Record and program after having been successfully written to the diskette. In this example, the size of the program was 23 sectors.

|  | Sector Number | | | | | | | | | | | | | | | | | | |
|---|---|---|---|---|---|---|---|---|---|---|---|---|---|---|---|---|---|---|---|
| Head 0 | 1 | 2 | 3 | 4 | 5 | 6 | 7 | 8 | 9 | 10 | 11 | 12 | 13 | 14 | 15 | 16 | 17 | 18 | |
| Track Number 2 | X | X | X | X | X | | | | | | | | | | | | | | |
| 1 | X | X | X | X | X | X | X | X | X | X | X | X | X | X | X | X | X | X | |
| 0 | Y | | | | | | | | | | | | | | | | | | |

Y = Master Boot Record
X = Program location

Loader

During the boot process in the preferred embodiment, the BIOS attempts to read the first logical sector from the diskette into memory at location 0000:7C00h. The BIOS then determines if this sector is a Master Boot Record by verifying that the final word is AA55h. If the MBR (Master Boot Record) is valid, execution of the loader begins at location 0000:7C00h. The loader will perform the following steps:

- Read the program from the diskette into memory at location 5000:0000h using a loop similar to that in SaveToDisk. The size of the program (in sectors) is stored in the Master Boot Record. See Section 5.4.2.1.
- Set the data segment to 5000h plus its offset with respect to the code segment. The Master Boot Record contains this value. See Section 5.4.2.1.
- Set the stack segment equal to the data segment.
- Set the stack pointer to FFFFh.
- Push the new code segment of 5000h onto the stack
- Push the offset of the Start label onto the stack. The Master Boot Record contains this value. See Section 5.4.2.1.
- Perform a RETF instruction (a "return far" instruction in MASM (MICROSOFT Macro Assembler) code mnemonics) A RETURN could be substituted for the RETF.

Start

Figure 2:
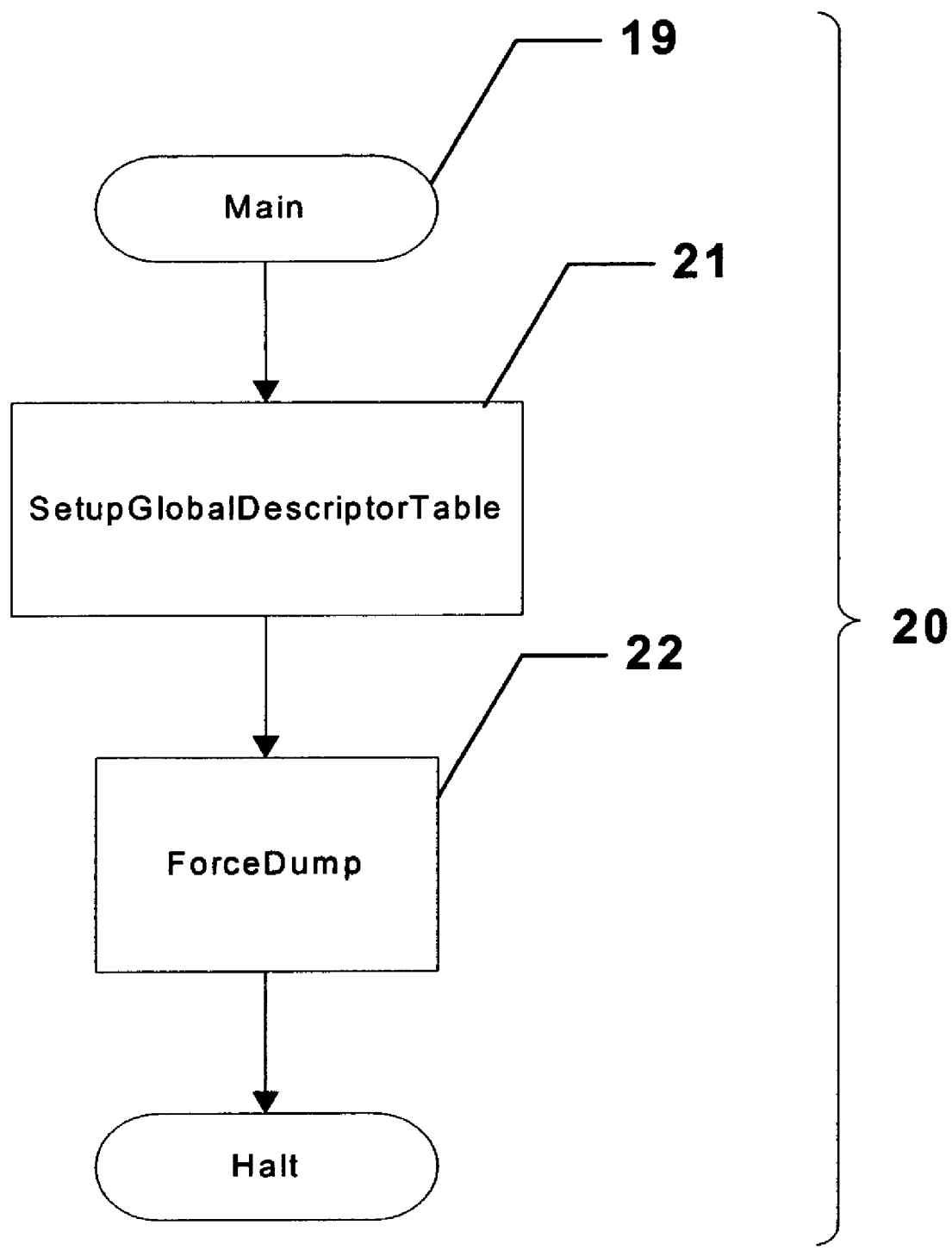
FIG. 2 is a high level flow diagram of a boot crash dump program flow in accord with a preferred embodiment of the invention.

This is the point of execution after the RETF instruction by the loader. Start is an offset (identified by a label) within the Main assembly procedure 19. The flow chart 20 of FIG. 2 describes the overall flow of the BCD program.

SetupGlobalDescriptorTable—21

Once the loader has handed off execution to the program, the processor is still in real-address mode. Because the Boot Crash Dump program will eventually enter protected mode, each real-address mode segment will need to have a segment descriptor in the Global Descriptor Table (GDT). The first entry in the GDT is called the NULL descriptor. Since the processor never references the NULL descriptor, then this implies that the data stored in its place can be used for any purpose. Therefore you can use the NULL descriptor to store a pointer to the GDT itself. The Load Global Descriptor Table Register (LGDT) instruction needs a six-byte pointer to the GDT and the NULL descriptor has 8 bytes that aren't accessed by the CPU, making it an ideal candidate for this purpose. The lowest 2 bytes of the NULL descriptor are used to store the size of the GDT and the next highest 4 bytes to store the physical address.

The chart below serves as a guide for the construction of each segment descriptors. Note that the CS, DS, and SS registers all have base addresses that are determined at run-time. SetupGlobalDescriptorTable must convert these real-address mode addresses to physical addresses, and then create the appropriate segment descriptor. All other segment descriptors/attributes can be explicitly defined.

| Entry | CS | DS | SS | Page Directory | Read Buffer |
|---|---|---|---|---|---|
| AVL | 0 | 0 | 0 | 0 | 0 |
| BASE | — | — | — | 00070000h | 00080000h |
| D/B | 0 | 0 | 0 | 0 | 0 |
| DPL | 0 | 0 | 0 | 0 | 0 |
| G | 0 | 0 | 0 | 0 | 0 |
| LIMIT | 0FFFFh | 0FFFFh | 0FFFFh | 0FFFFh | 0FFFFh |
| P | 1 | 1 | 1 | 1 | 1 |
| S | 1 | 1 | 1 | 1 | 1 |
| TYPE | Bh | 3 | 3 | 3 | 3 |

ForceDump—22

Figure 3:
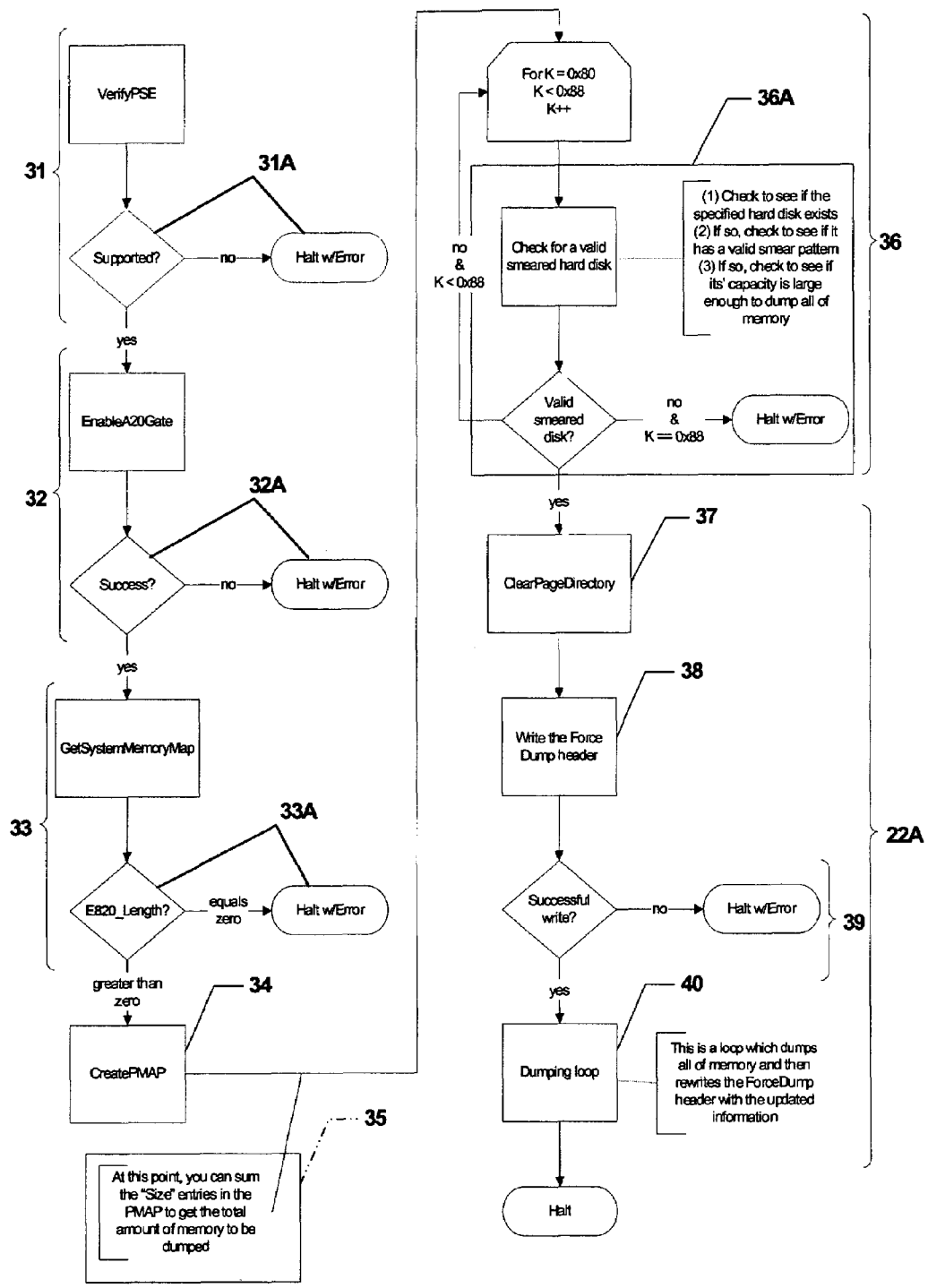
FIG. 3 is a flow diagram of program flow for the Force Dump procedure of the preferred embodiment of the invention.
Figure 4:
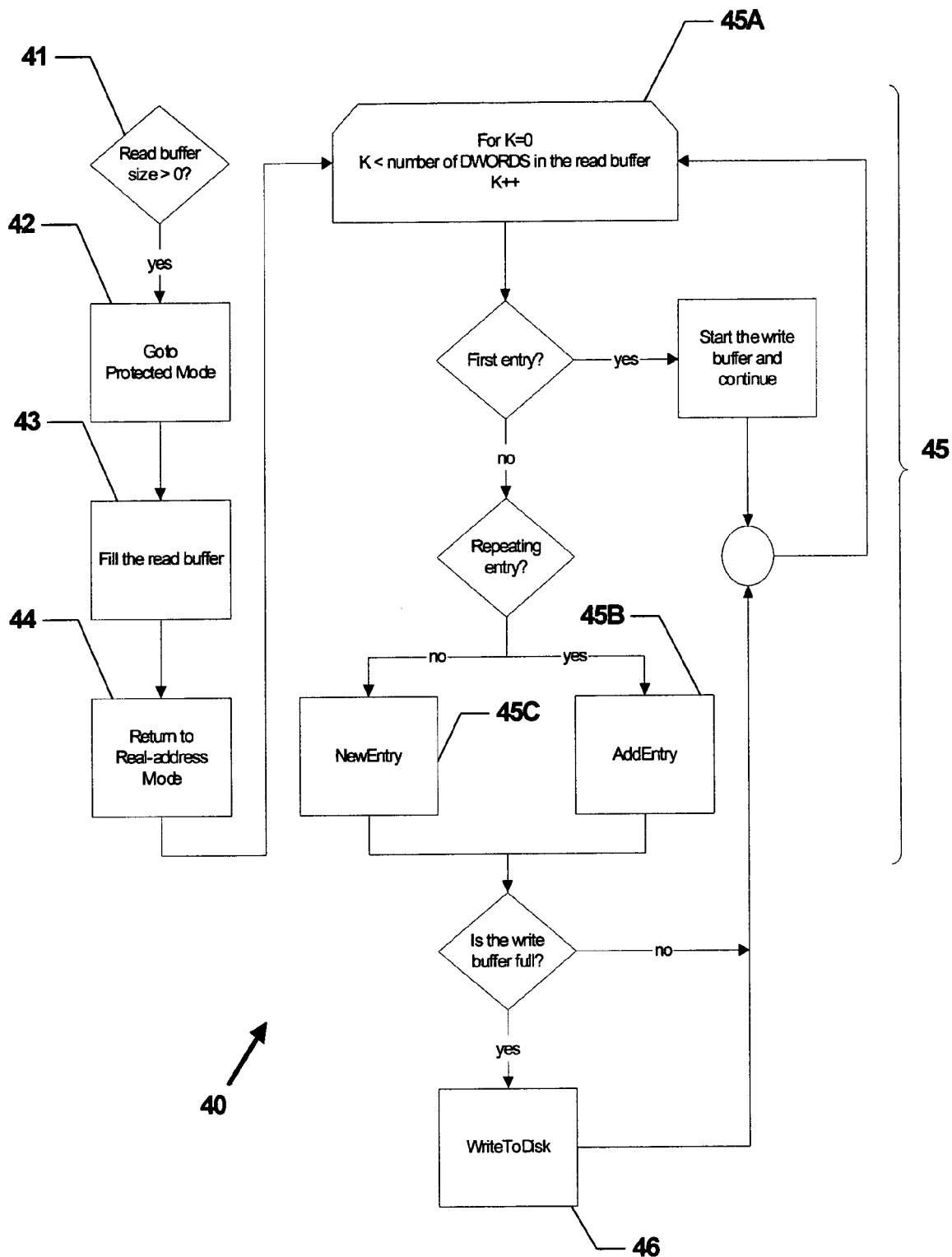
FIG. 4 is a flow diagram of program flow for the dumping loop of the preferred embodiment of the invention.

After setting up the GDT, a call is made to an external C function called _ForceDump. (The C calling convention requires the leading underscore.) See description of FIGS. 3 and 4 for detailed description of this ForceDump procedure 22.

Mode Switching

To access memory up to 64 GB, the processor needs to be in protected mode and have paging enabled. The following sections give the preferred steps to achieve these mode switches, since they will be needed when this invention is used in its preferred target computer systems having large main memory stores running Windows operating system.

Real-Address Mode to Protected Mode with Paging

To switch to protected mode, the following steps are performed:

1. Disable maskable hardware interrupts with a CLI instruction.
2. Push the current, real-address mode CS on the stack.
3. Backup the SS, DS, ES, FS, and GS registers so they can be restored once we return to real-address mode.
4. Execute the LGDT instruction to load the GDTR register with the base address of the GDT that was setup in SetupGlobalDescriptorTable.
5. Load the CR3 register with the physical address of the Page Directory.
6. Set the PSE bit and clear the PAE bit of the CR4 register
7. Set the PG and PE bits of the CR0 register.
8. Execute a far JMP to the next instruction in the instruction stream. This will reset the CS register. NOTE: The code for the MOV CR0 instruction and the JMP instruction must come from a page that is identity mapped (that is, the linear address before the jump is the same as the physical address after paging protected mode is enabled).
9. Update the contents of the remaining segment registers with protected mode selectors.
10. Execute the STI instruction to enable maskable hardware interrupts.

Protected Mode with Paging to Real-Address Mode

To re-enter real-address mode, the following steps are performed:

1. Disable maskable hardware interrupts with a CLI instruction.
2. Clear the PG and PE bits of the CR0 register.
3. Move 00000000h into the CR3 register to flush the TLB.
4. Clear the PSE and PAE bits of the CR4 register.
5. Push the offset of the next instruction onto the stack and execute a RETF instruction that jumps to that instruction. (The real-address mode CS was previously pushed onto the stack during the switch to protected mode.) This operation flushes the instruction queue and loads the appropriate base and access rights values in the CS register.
6. Restore the SS, DS, ES, FS, and GS registers as needed by the real-address mode code.
7. Execute the STI instruction to enable maskable hardware interrupts.

ForceDump

The ForceDump procedure is the 'driver' portion of the Boot Memory Dump program that reads the system memory and dumps it to disk. The process is outlined in a flow chart 22A in FIG. 3. It is called by the assembly language Main procedure, after the console screen has been initialized and the Global Descriptor Table (GDT) has been set up with the addresses of the memory buffers and tables used by Force-Dump. Procedure ForceDump accomplishes the memory read/write to disk process through both its own internal code and calls to the assembly and C++ procedures described above. It does not process any parameters.

Procedure ForceDump does the following:

A 'Welcome' message is displayed on the console screen.

Procedure VerifyPSE is called to verify 31 that the processor supports the Page Size Extension (PSE-36) feature, which is required by ForceDump. If the feature is not supported, an error message is displayed on the console screen and the program terminates 31A.

Procedure EnableA20Gate is called to enable access to extended memory (memory addresses over 1 MB, 10 0000h) 32. If the ensuing BIOS call fails, an error message is displayed on the console screen and the program terminates 32A.

Procedure GetSystemMemoryMap is called to obtain the system memory map maintained by the BIOS 33. The memory map obtained by GetSystemMemoryMap is stored in the Force Dump Header and displayed on the console screen. If the call returns a failure result, an error message is displayed on the console screen and the program terminates 33A.

Procedure CreatePMAP is called to convert the system memory map into a page map (PMAP) 34 that is used directly by the Boot Memory Dump program to determine the total amount of memory needed to store the dump 35. The PMAP is stored in the Force Dump Header and displayed on the console screen.

The sizes of all the OS-accessible memory segments listed in the PMAP entries are summed to obtain the total size of the memory to be dumped. The total size of the memory to be dumped is displayed on the console screen as a part of step 35.

A series of up to eight calls to procedure GetExtended-DriveParameters are made to identify the Boot Memory Dump disk and to determine its drive parameters 36. For each drive identified by GetExtendedDriveParameters, a procedure named PrepareDAP (not shown) is called to set up the Disk Access Packet (DAP) to read the first three sectors of the disk. Then procedure ExtendedReadSectors (also not shown) is called to transfer the contents of the three disk sectors to the read buffer in memory. The ExtendedRead-Sectors procedure may call for compression in storing the data to the buffer in memory if desired. The presence or absence and status of each present disk drive examined is preferably displayed on the console screen.

For each drive identified by GetExtendedDriveParameters, the capacity of the drive is compared to the total size of the memory to be dumped and procedure VerifySmear-Pattern 36A is called to determine if the first three disk sectors contain the 'signature' of the Boot Memory Dump disk. If both tests are successful, the Boot Memory Dump disk has been identified and the disk identifier and capacity are displayed on the console screen. If none of the eight drives tested is identified as a dump disk, an error message is displayed on the console screen and the program terminates.

Procedure ClearPageDirectory 37 is called to initialize (clear to zero) the page directory.

Progress fields "<bytes processed> of <total size of the memory to be dumped>", "Compressed Size", and "Percent Complete" are initialized and preferably displayed on the console screen by ClearPageDirectory procedure 37.

The (preliminary) contents of the Force Dump Header are written to the Boot Memory Dump disk 38. Procedure PrepareDAP is called to set up the Disk Access Packet (DAP) to write three sectors of the disk, starting at sector three. Procedure ExtendedWriteSectors is called to perform the write operation. If the disk write operation fails, the disk address for the write operation is advanced by three sectors and ExtendedWriteSectors is called to retry the write operation. When the write operation succeeds, usable disk sector information maintained by the program is initialized. If three write failures occur, an error message is displayed on the console screen and the program terminates. A simplified description of this test for whether the write operation was performed is indicated at 39 in flow chart 22A.

The address and size of the first OS-accessible memory segment is obtained from the PMAP (from step 34). A generalized form of the Dumping Loop is illustrated in the flow diagram 40 of FIG. 4. The buffer size is checked and the system is put into protected mode for the remainder of this procedure.

A Procedure named SetupPageDirectoryEntries (described in detail later) is called to place the address of the system memory to be accessed into the proper fields of a Page Directory Entry.

System memory is accessed in pieces of 64,512 (FC00h) bytes, i.e. 126 segments in our preferred computer systems. Accordingly, a procedure called FillBuffer (described later) is called to transfer 64,512 bytes of memory to a read buffer (step 43) for further processing. The system is returned to Real-address mode 44.

Each 32-bit word in the read buffer is compared to the 32-bit word preceding it from the read buffer. This is illustrated as beginning with the loop instruction 45A for K=0 to K, where K is the number of words in the read buffer (FC00h) 45. If the two 32-bit words match, procedure AddEntry 45B is called; if they don't match, procedure NewEntry 45C is called. These two procedures, described later, implement the program's simple compression algorithm. They store the compressed memory information in the write buffer.

When AddEntry and NewEntry have filled the write buffer, a procedure named WriteToDisk 46 is called to transfer the contents of the write buffer to the (preferably prepared by a smear program) dump disk. The usable disk sector information in the Force Dump Header is maintained by the WriteToDisk procedure.

Progress fields "<bytes processed> of <total size of the memory to be dumped>", "Compressed Size", and "Percent Complete" are preferably updated and displayed on the console screen while the procedures execute.

When all of the memory described by the current PMAP entry has been processed, the address and size of the next OS-accessible memory segment to be processed is obtained from the next PMAP entry, and the above steps are repeated.

When all of the memory described by the final PMAP entry has been processed, procedure WriteToDisk is called to transfer any remaining data in the write buffer to the dump disk.

The final contents of the Force Dump Header, with the updated usable disk sector information, are written to the Boot Memory Dump disk. Procedure PrepareDAP is called to set up the Disk Access Packet (DAP) to write three sectors of the disk, starting at disk address of the original successful Force Dump Header write operation. Procedure ExtendedWriteSectors is called to perform the write operation. If the disk write operation fails, an error message is displayed on the console screen and the program terminates.

Otherwise, a successful termination message is displayed on the console screen, procedure ForceDump returns to assembly procedure MAIN which called it, and the program terminates.

| Called by: | Main |
|---|---|
| Parameters: | none |
| Return: | nothing |

Additional Assembly Procedures

These procedures, mentioned in the description above, are described in detail in the sections below.

MICROSOFT (R) C/C++ Optimizing Compiler Version 8.00c is a 16-bit compiler. Therefore, the inline assembler will only allow use of 16-bit registers. Due to this restriction and the low-level nature of the Boot Crash Dump program, it is necessary to write some external procedures in assembly language.

EnableA20Gate

The processor's A20 address line controls the accessibility of extended memory (memory addressed over 1 MB, 100000h). EnableA20Gate calls the BIOS Interrupt 15h Function 2401h to enable access to extended memory.

| Called by: | ForceDump |
|---|---|
| Parameters: | none |
| Return: | AX = 0000h - failure |
| | AX = 0001h - success |

VerifyPSE

The Boot Crash Dump program utilizes the Page Size Extension (PSE) feature of the IA-32 processor to access memory addresses greater than 4 GB (40000000h). VerifyPSE issues the CPUID instruction to the processor, which returns processor identification and feature information in the general registers. Bit 17 of the EDX register is tested to determine whether the processor supports the PSE feature.

| Called by: | ForceDump |
|---|---|
| Parameters: | none |
| Return: | AX = 0000h - the PSE feature is not supported |
| | AX = 0001b - the PSE feature is supported |

WriteToVRAM

WriteToVRAM displays a NULL terminated, ASCII string at a specified location on the console terminal by writing it directly to video memory. WriteToVRAM initially checks the current processor mode. If the processor is in real-address mode, the real-address mode video memory segment (B800h) is referenced; otherwise the equivalent protected mode selector is referenced. The starting row and column are used to calculate an offset within video memory from which to write the string. A loop will write the ASCII characters and their specified video attribute into video memory at successive locations until a NULL (00h) character is encountered.

| Called by: | ForceDump, WriteToDisk |
|---|---|
| Parameters: | WORD - pointer to the NULL terminated, ASCII string |
| | BYTE - starting column |
| | BYTE - starting row |
| | BYTE - video attribute byte(bit 7 = blink, bits 6-4 = background, bits 3-0 3-0 = foreground) |
| Return: | nothing |

GetSystemMemoryMap

This procedure obtains the system memory map maintained by the BIOS. The only parameter passed to this procedure is a pointer to an array of E820_Descriptor type that will store the system memory map. The BIOS provides a Get System Memory Map function (detailed below), which returns a single memory map entry (E820_Descriptor). Using this function in a loop, each entry will be saved to the array structure. Each successful function call will increment a counter representing the number of memory map entries. The calls continue until either the BIOS indicates the end of the memory map has been reached, the limit of 20 h entries has been reached, or an error has occurred.

| Called by: | ForceDump |
|---|---|
| Parameters: | WORD - pointer to a 20h-element array of type E820_Descriptor (See Section 5.4.1.3) |
| Return: | AX = number of entries in the system memory map |
| Get System Memory Map - Interrupt 15h Function E820h | |
| | AX = E820h |
| | EAX = 0000E820h |
| | EDX = 534D4150h ('SMAP') |
| | EBX = continuation value or 00000000h to start at beginning of map |
| | ECX = size of buffer for result, in bytes (should be >= 20 bytes) |
| | ES:DI -> buffer for result (See Section 5.4.1.3) |
| Return: | CF clear if successful |
| | EAX = 534D4150h ('SMAP') |
| | ES:DI buffer filled |
| | EBX = next offset from which to copy of 00000000h if all done |
| | ECX = actual length returned in bytes |
| | CF set on error |
| | AH = error code (86h) |

Get Extended Drive Parameters

This function uses the Get Extended Drive Parameters BIOS function (detailed below) to obtain the extended drive information for a specified hard disk. ForceDump needs this information to compare the disk drive capacity to the total system memory to be dumped. Parameters passed in are the specific drive number and a pointer to a buffer for the results. GetExtendedDriveParameters will fail if the drive does not exist.

```
Called by:    ForceDump
Parameters:   BYTE - drive number (80h-FFh)
WORD - pointer to an Extended_Drive_Information_Table (See Section 5.4.1.9)
Return:       AX = 0000h - failure
AX = 0001h - success
Get Extended Drive Parameters - Interrupt 13h Function 48h
              AH = 48h
              DL = drive number (80h-FFh)
              DS:SI -> buffer for drive parameters (See Section 5.4.1.9)
Return:       CF clear if successful
              AH = 00h
                DS:SI buffer filled
              CF set on error
              AH = error code
```

ExtendedReadSectors

This procedure uses the BIOS function ExtendedReadSectors (detailed below) to read sectors from the hard disk into memory. ExtendedReadSectors requires the use of a Disk Address Packet (DAP) structure to specify the number of sectors to transfer, where on the disk to begin reading, and where to load the data into memory. The DAP should be configured properly before calling ExtendedReadSectors. The specified drive number and a pointer to the DAP are passed in as parameters to this procedure.

```
Called by:       ForceDump
Parameters: BYTE - drive number
WORD - pointer to a Disk_Address_Packet (See Section 5.4.1.7)
Return:          AX = 0000h - failure
                 AX = 0001h - success
Extended Read Sectors - Interrupt 13h Function 42h
                 AH = 42h
                 DL = drive number
                 DS:SI -> disk address packet (See Section 5.4.1.7)
Return:          CF clear if successful
                 AH = 00h
                 CF set on error
                 AH = error code
                   disk address packet's block count field set
to number of block successfully transferred
```

ExtendedWriteSectors

This procedure uses the BIOS function ExtendedWriteSectors (detailed below) to write sectors to the hard disk from memory. ExtendedWriteSectors requires the use of a Disk Address Packet (DAP) to specify the number of sectors to transfer, where on the disk to begin writing, and where to get the data from memory. The DAP should be configured properly before calling ExtendedWriteSectors. The specified drive number and a pointer to the DAP are passed in as parameters to this procedure.

NOTE: An option is provided to verify the write. This feature is not available on the ES7000 PHOENIX BIOS implementation. Therefore, you must write with verify OFF.

```
Called by:    ForceDump, WriteToDisk
Parameters:   BYTE - drive number
WORD - pointer to a Disk_Address_Packet (See Section 5.4.1.7)
Return:       AX = 0000h - failure
              AX = 0001h - success
Extended Write Sectors - Interrupt 13h Function 43h
              AH = 43h
              AL = write flags
                bit 0: verify write
                bits 7-1 = reserved (0)
              DL = drive number
              DS:SI -> disk address packet (See Section 5.4.1.7)
Return:   CF clear if successful
              AH = 00h
              CF set on error
              AH = error code
                disk address packet's block count field set to number
                of block successfully transferred
```

FillBuffer

FillBuffer is the assembly procedure used to transfer memory (address ranges up to 64 GB) to a real-address mode buffer for further processing (compression and transfer to disk). The caller of FillBuffer creates a Page Directory Entry (PDE) for access to a specific location within the linear address space (up to 36 bits=64 GB). This PDE is used by the Page Size Extension (PSE-36) paging mechanism to address memory above the 4 GB limit imposed by 32-bit addressing.

When called, procedure FillBuffer is passed two parameters on the stack: a 32-bit count representing the total number of bytes of memory to be transferred (up to FC00h bytes), and a 32-bit offset within the current 4 MB page from which to begin transfer. FillBuffer first disables maskable hardware interrupts and invokes assembly macro ProtectedMode (See Section 5.4.3.1) to put the processor into protected mode and enable PSE-36 addressing. The parameters are then retrieved from the stack. Memory is transferred 32 bits at a time from 4 MB page to the destination buffer. After each 32-bit transfer, the source and destination addresses are incremented by 4 bytes, and the current number of bytes transferred is compared to the transfer count parameter provided on the stack. When the transfer is complete, assembly macro RealMode (See Section 5.4.3.2) is invoked to return the processor to real-address mode. Maskable hardware interrupts are re-enabled and FillBuffer exits.

```
Called by:     ForceDump
Parameters:    DWORD - size of the read buffer to transfer
               DWORD - starting offset into the 4MB page
Return:        nothing
```

Halt

Halt is an assembly routine that terminates the Boot Crash Dump program by issuing the Clear Interrupt Flag (CLI) and Halt (HLT) instructions. Maskable interrupts are first disabled because the possibility exists for an interrupt to resume execution after a HLT instruction.

```
Called by:     ForceDump, WriteToDisk
Parameters:    none
Return:        nothing
```

Additional C++ Procedures

Since the ForceDump procedure is written in C++, any additional procedures that do not require the use of external assembly language should be written in C++.

CreatePMAP

Procedure CreatePMAP is passed a single parameter: a pointer to the Force Dump Header structure in memory.

CreatePMAP converts the system memory map produced by assembly language procedure GetSystemMemoryMap, into a page map (PMAP) which is used directly by the Boot Memory Dump program. GetSystemMemoryMap creates an array (E820) of entries of E820_Descriptor_type that is stored in the Force Dump Header (see FD_Header_type above). Each E820 entry describes a region of main memory: the starting address of the memory region, its length in bytes, and the type of memory (i.e. whether accessible to the OS, or not). CreatePMAP uses the information in the E820 array to build a second array (PMAP), also stored in the Force Dump Header, whose entries contain the starting address (UINT64) and size (UINT64) of only those memory regions that are accessible to the OS.

The system BIOS, as part of the system boot process, copies the first 4 MB (40 0000h) of main memory to a memory area (address 0xFF400000) that is reserved for use by the BIOS and is not accessible to the OS. CreatePMAP places this area's address and size as the starting address and size of the first entry in the PMAP array. CreatePMAP then examines those entries in the E820 array that describe regions of memory that are accessible to the OS. E820 entries describing regions that are contained within the first 4 MB of memory are discarded, as they are already included in the first entry of the PMAP array. For an E820 entry that overlaps the 4 MB address boundary, CreatePMAP adjusts the starting address and size so that only the region above the 4 MB boundary is placed in the next PMAP array entry. The starting address and size of OS-accessible E820 entries are placed in subsequent PMAP array entries. The final number of entries in the PMAP array is kept in a variable, PMAPLength, which is stored in the Force Dump Header.

The Boot Memory Dump program uses the memory map information provided in the PMAP array to identify the memory ranges available to the OS, which are dumped to disk for analysis by the Windbg tool.

| Called by: | ForceDump |
| --- | --- |
| Parameters: | PFD_Header - pointer to the FD_Header structure that will be written before the dump (See Section 5.4.1.6) |
| Return: | nothing |

PrepareDAP

PrepareDAP is passed 4 parameters: a pointer to the Disk Address Packet (DAP) structure, the number of sectors of data to transfer, a pointer to a buffer from/to which data is to be transferred, and the sector address on disk from/to which data is to be transferred. The values of the latter three parameters are loaded into the appropriate fields of the DAP structure pointed to by the first parameter. PrepareDAP returns no value.

| Called by: | ForceDump, WriteToDisk |
| --- | --- |
| Parameters: | PDisk_Address_Packet - pointer to a Disk_Address_Packet (See Section 5.4.1.7)<br>unsigned short - number of blocks to transfer |

-continued

| | unsigned long - pointer to the transfer buffer<br>UINT64 - starting absolute block number |
| --- | --- |
| Return: | nothing |

VerifySmearPattern

This procedure is passed a pointer to a buffer containing the first 3 sectors from the hard disk. VerifySmearPattern will loop through this 600h-byte buffer to verify that it is smeared with the ASCII pattern "DISKDUMP".

| Called by: | ForceDump |
| --- | --- |
| Parameters: | unsigned long far* - pointer to a buffer containing the first 3 sectors from the hard disk |
| Return: | int - 1 - smear pattern is invalid<br>int - 0 - smear pattern is valid |

ClearPageDirectory

ClearPageDirectory does exactly what its' name implies. It clears all page directory entries in the page directory by setting them to 00000000h.

| Called by: | ForceDump |
| --- | --- |
| Parameters: | unsigned long far* - pointer to the Page Directory |
| Return: | nothing |

SetupPageDirectoryEntries

The Boot Memory Dump program uses the paging mechanism provided by the IA-32 processor's protected mode to access system memory. The Page Size Extension (PSE) facility, which permits the use of 36-bit addressing, is used to access system memory of up to 64 GB (10 0000 0000h bytes). The PSE facility accesses physical memory as a series of 4 MB (40 0000h) pages. The addresses of the pages are kept in a page directory, an array of page directory entries (PDE) in which each directory entry contains the 14-bit address of a 4 MB page. The physical address of each memory byte is comprised of the 14-bit page address and a 22-bit offset into the page.

Boot Memory Dump walks through the system memory to be dumped (memory accessible to the OS, as determined by the entries in the PMAP array described above) by sequentially inserting the 14-bit address of each 4 MB page in a PDE that is an entry in a page directory array stored in program memory, then reading up to 4 MB of memory accessible through that page. The page directory array has two PDE entries; the first containing the base address of the 4 MB page currently being processed, and the second containing the base address of the following 4 MB page which is used for possible address overflow for the memory area being processed.

Procedure SetupPageDirectoryEntries is passed two parameters: a pointer to the page directory in memory, and a 64-bit linear address of the memory area being accessed. SetupPageDirectoryEntries segregates the upper 14 bits of the 36-bit linear address, and places them in the appropriate fields (bits 13 . . . 16 and 22 . . . 31) of the page directory entry (PDE). Then the Page Size (4 MB), Read/Write and Present flag bits of the PDE are set.

| | |
|---|---|
| Called by: | ForceDump |
| Parameters: | unsigned long far* - pointer to the Page Directory |
| | UINT64 - physical address of the memory area to be accessed |
| Return: | nothing |

AddEntry

Procedure AddEntry is one of the two procedures that implement the compression algorithm of the Boot memory Dump program. The runtime compression algorithm operates by identifying repeating sequences of 32-bit doublewords (dwords) in memory, e.g. a memory area that has been zeroed, and reducing each repeating sequence of up to fifteen such dwords to a 4-bit count and the 32-bit value of the dword. The compressed memory dump file is a series of records of structure Compressed_Entry_type, previously described. Each 9-byte record contains in the first byte an 8-bit unsigned integer containing in the upper four bits the repetition count, from 1 to 15, of a single or repeated dword, and in the lower four bits the repetition count, again from 1 to 15, of the succeeding single or repeated dword. The 'counts' byte is followed by two 4-byte fields, each field containing the 32-bit value of a dword represented by a count in the first byte.

When the main loop in procedure ForceDump of the Boot Memory Dump program encounters a 32-bit word in memory that is the same as the preceding 32-bit word, procedure AddEntry is called. AddEntry is passed five parameters: (1) a 2-element array containing the current counts of each of the two dwords being processed for the Compressed_Entry_type record, (2) an indicator of which dword of the pair is being processed by this call, (3) a pointer to the buffer which will be written to disk, (4) the write buffer index of the record being processed, and (5) the value of the dword being processed.

Procedure AddEntry increments the count value of the dword being processed, and updates the Compressed_Entry_type record. If the updated count exceeds fifteen, AddEntry sets the count of the current field to 15 and moves to the next field available to receive data, either the second field in the current record or the first field in the next record. The value of the dword being processed is entered in that field with a count of 1.

| | |
|---|---|
| Called by: | ForceDump |
| Parameters: | unsigned long - the DWORD currently being processed |
| | unsigned char[ ] - pointer to a 2-element array containing the current counts of each of the 2 DWORDS being processed. |
| | unsigned char& - an reference to an indicator of which DWORD of the pair is being processed by this call |
| | Compressed_Entry far* - pointer to the buffer of type Compressed_Entry (See Section 5.4.1.8) that is eventually written to disk |
| | unsigned short& - a reference to the index into the write buffer |
| Returns: | nothing |

NewEntry

Procedure NewEntry is the other of the two procedures that implement the compression algorithm of the Boot memory Dump program (see AddEntry above). When the main loop in procedure ForceDump of the Boot Memory Dump program encounters a 32-bit word in memory that is the not same as the preceding 32-bit word, procedure NewEntry is called. NewEntry is passed the same five parameters as AddEntry: (1) a 2-element array containing the current counts of each of the two dwords being processed for the Compressed_Entry_type record, (2) an indicator of which dword of the pair is being processed by this call, (3) a pointer to the buffer which will be written to disk, (4) the write buffer index of the record being processed, and (5) the value of the dword being processed.

NewEntry moves to the next field available to receive data, either the second field in the current record or the first field in the next record. The value of the dword being processed is entered in that field with a count of 1.

| | |
|---|---|
| Called by: | ForceDump |
| Parameters: | unsigned long - the DWORD currently being processed |
| | unsigned char[ ] - pointer to a 2-element array containing the current counts of each of the 2 DWORDS being processed. |
| | unsigned char& - an reference to an indicator of which DWORD of the pair is being processed by this call |
| | Compressed_Entry far* - pointer to the buffer of type Compressed_Entry (See Section 5.4.1.8) that is eventually written to disk |
| | unsigned short& - a reference to the index into the write buffer |
| Returns: | nothing |

WriteToDisk

WriteToDisk is the procedure called to transfer compressed system memory data from the write buffer to the disk drive. It incorporates software mechanisms for identifying and reporting the usable disk sectors on which valid data is written. WriteToDisk calls assembly procedure ExtendedWriteSectors to perform the actual disk write operation. ExtendedWriteSectors uses the Extended Write capabilities of the BIOS to transfer a specified number of sectors of data from the write buffer to the disk. The Extended Write function requires used of a Disk Address Packet (DAP), whose format was previously discussed.

Procedure WriteToDisk is passed five parameters: (1) a pointer to the Disk Address Packet (DAP) structure in memory, (2) a pointer to the Force Dump Header structure in memory, (3) the BIOS identifier of the disk drive to which the dump data is being written, (4) the sector address of the starting sector to which data is to be written, and (5) the number of sectors to be written. WriteToDisk maintains information in the Force Dump Header about the disk sectors on which the dump data is written. This information is maintained in an array, each element of the array contains the starting and ending sector addresses of a set of contiguous disk sectors containing dump data.

WriteToDisk first calls procedure PrepareDAP, passing the DAP, the number of sectors to be written, a pointer to the write buffer from which data is to be transferred, and the number of sectors to be written. PrepareDAP places these values in the DAP which will be used for the write operation. WriteToDisk then calls assembly procedure ExtendedWriteSectors, passing the dump disk drive identifier and the pointer to the DAP, to perform the write operation. If the call to ExtendedWriteSectors returns a write failure indication a counter of the sets of usable sectors is incremented and compared to a maximum value (10). If this maximum is exceeded, an error message is displayed on the console and the Boot Memory Dump program terminates. If the sets of usable sectors maximum is not exceeded, the current set of usable sectors is terminated and a new set is started. Then the starting sector address is incremented and the write is again attempted. Write attempts are repeated, with the starting sector address repeatedly incremented, until the write succeeds or a maximum write failure value (10) is exceeded. Again, if this maximum is exceeded, an error message is displayed on the console and the Boot Memory Dump program terminates.

When the write operation succeeds, the starting sector address is updated for the next write, and the usable sectors information is updated in the Force Dump Header.

| | |
|---|---|
| Called by: | ForceDump |
| Parameters: | PDisk_Address_Packet - pointer to a Disk_Address_Packet (See Section 5.4.1.7) |
| | PFD_Header - pointer to the FD_Header structure that will be written before the dump (See Section 5.4.1.6) |
| | unsigned char - drive number |
| | UINT64& - reference to a UINT64 variable containing the hard disk sector where the next write will begin |
| | unsigned short - number of sectors to be written |
| Returns: | nothing |

Consolidator Program

The Consolidator Program function is to take the memory image dumped by the BCD program, uncompress it and format it into a file that is analyzable by an analysis tool. Each OS has it own dump analysis tool, thus causing the format of dump file to be OS specific.

The easiest approach is to have the Consolidator program to format the dump into a flat memory image file and have a simple dump analysis tool that dumps ranges of physical memory. Such a tool would be very basic and would just display the contents of memory for a specified range.

To analyze complicated Operating System problems, it is preferable to use the Operating System's own dump analysis tool. The Consolidator can be written to format the memory image into a specific format for an Operating System dump analysis tool. Open systems, such as Linux and UNIX, make it easier to modify the Consolidator Program to create a memory dump file that is compatible with their Operating System's dump analysis tool.

Proprietary systems such as MICROSOFT® Windows need documented interfaces to help create a properly formatted dump for the Windows Debug program, Windbg, to be able to analyze it.

Also as stated in the Summary of the Invention, an OS component or driver may be needed on systems that do not collect information about the OS key components until the OS is about to take a crash dump. The information about the OS key components is needed by the OS's dump analysis tool.

The invention claimed is:

1. A method for capturing an image of memory from multiprocessor-based computer system that has become frozen and copying it to a long term storage device comprising:
    triggering an activation of a series of processes for preserving said memory with a triggering action,
    copying a first region of low memory,
    booting the computer system, and
    writing the image of memory outside the first region of low memory to a long term storage volume.

2. The method of claim 1 wherein a modification is made to a BIOS of said computer system that maintains said memory image outside of said first region of low memory in an uncorrupted state through reboot.

3. The method of claim 1 wherein said action is initiated by an operator detecting that said system is frozen and inserting a boot volume into a boot volume drive, said boot volume containing a BCD program, said operator ensuring that the long term storage device is associated with said system.

4. The method of claim 3 wherein said writing step writes from said outside said first region of low memory to a long term storage.

5. The method of claim 1 wherein the first region of low memory comprises the first four megabytes of storage of main memory of said computer system.

6. The method of claim 5 wherein said first region of low memory further comprises regions wherein structures and procedures have been established for use by an OS running in said computer system.

7. The method of claim 6 wherein said first region may include pointers to other files which may be needed by a Consolidator program and wherein said other files which may be needed are located on a boot volume.

8. The method of claim 1 wherein said copying step depends upon a modification to a BIOS, wherein said modification to said BIOS causes said first region of low memory to be moved to an other memory reserved region upon the boot, before said BIOS affects said first region of low memory.

9. The method of claim 8 wherein said modification to said BIOS causing said first region of low memory to be moved to said other memory reserved region upon the boot, before said BIOS affects said first region of low memory is triggered by setting a BIOS Setup option by an operator.

10. The method of claim 8 wherein said modification to said BIOS causing said first region of low memory to be moved to said other memory reserved region upon the boot, before said BIOS affects said first region of low memory is triggered by a Service Processor setting a bit in either a CMOS or configuration data field of said system.

11. The method of claim 8 wherein a second boot process loads a BCD program to accomplish said writing step.

12. The method of claim 1 wherein said activation step is accomplished by a Service Processor associated with said computer system recognizing a failure of said system and wherein said copying of the first region of low memory to a storage device is accomplished using said Service Processor.

13. The method of claim 1 wherein said copying step depends upon a procedure initiated by a user call to a Service Processor associated with said computer system, wherein said Service Processor procedure causes said first region of low memory to be copied to an other memory reserved region upon the boot when a predetermined sequence of instructions is found by said BIOS.

14. The method of claim 1 further comprising:
    prior to said frozen computer system freezing, preparing a long term storage by reserving a storage area greater than the memory of the frozen computer system.

15. The method of claim 14 wherein said preparing is accomplished by a smear program which writes specific data to said storage area greater than the memory of the frozen computer system.

16. The method of claim 14 wherein said preparing prepares a storage area sized based on a worst case scenario for a selected compression scheme.

17. The method of claim 1 wherein said long term storage volume is one recognized by a BIOS of said frozen computer system.

18. The method of claim 1 wherein said writing step further comprises compressing the data before writing.

19. The method of claim 1 further comprising, formatting all data in said long term storage having said memory above a first reserved memory area written to it in a manner useable by a predetermined program.

20. The method of claim 19 wherein said formatting is accomplished using a consolidator program.

21. A computer program data product having a computer readable storage medium containing encoded data comprising computer readable program code stored thereon, the computer readable code when executed by a computing system facilitates capture of the computer system's main memory upon freezing of said computer system, the computer program data product comprising:
   a Smear program which when operated configures said computer system to allow it to prepare a long term storage to receive data contents of said computer system's main memory after said computer system is restarted subsequent to said freezing,
   a Boot Crash Dump program which when operated configures said computer system to allow it to save the data contents of said main memory to said prepared long term storage, and
   a Consolidator program which when operated on a computer having access to said saved data contents to allow it to organize and format said saved data contents appropriately for later access and use by a debugging program.

22. The computer data product of claim 21 further comprising an OS component or driver which when operated gathers information on said computer system to allow the later analysis of the frozen system memory image.

23. The computer data product set forth in claim 21 wherein said Boot Crash Dump program contains a compression algorithm for saving said data contents in a compressed format onto a prepared bard disk drive.

24. The computer data product set forth in claim 21 wherein said Smear program prepares said hard disk drive by writing a reserve region pattern on a long term storage device.

25. The computer data product set forth in claim 21 wherein said Consolidator program formats and organizes said saved data contents appropriately for OS dump analysis tools.

26. A system for saving the contents of a block of computer memory from a computer system after said computer system has frozen, the system comprising:
   one or more processing modules for performing programmable processing tasks defined within a set of processing modules;
   the block of computer memory for maintaining the one or more processing modules and associated data, the block of computer memory having a region of low computer memory and a reserved region of computer memory;
   a boot volume corresponding to a long term storage device for maintaining the set of processing modules and associated data, a set of system processing modules and associated data for booting said computer system and launching processing tasks associated with the set of processing modules; and
   a facility within a Service Processor of said computer system which operates to save said region of low computer memory to said reserved region of computer memory upon a trigger signal of an option being specified on the Service Processor when said frozen computer system is restarted with said boot volume.

27. The system of claim 26 wherein said option is specified by an operator when said system is found by said operator to be frozen.

28. The system of claim 26 wherein said option is specified by an operator previous to said system being frozen and wherein said Service Processor automatically activates said option upon loss of a heartbeat signal from said system, said loss of heartbeat signal indicating to said Service Processor that said system is frozen.

29. The system of claim 26 wherein said one or more processing modules comprises:
   a Smear program which when operated configures said computer system to allow it to prepare long term storage to receive data contents of said computer system's main memory after said computer system is restarted subsequent to said freezing,
   a Boot Crash Dump program which when operated configures said computer system to allow it to save the data contents of said main memory to said prepared long term storage, and
   a Consolidator program which when operated on a computer having access to said saved data contents to allow it to organize and format said saved data contents appropriately for later access and use by a debugging program.

* * * * *